April 22, 1969          W. G. BAKER ET AL          3,439,546
                    FLOATED INERTIAL PLATFORM
Filed Oct. 24, 1965                          Sheet 1 of 5
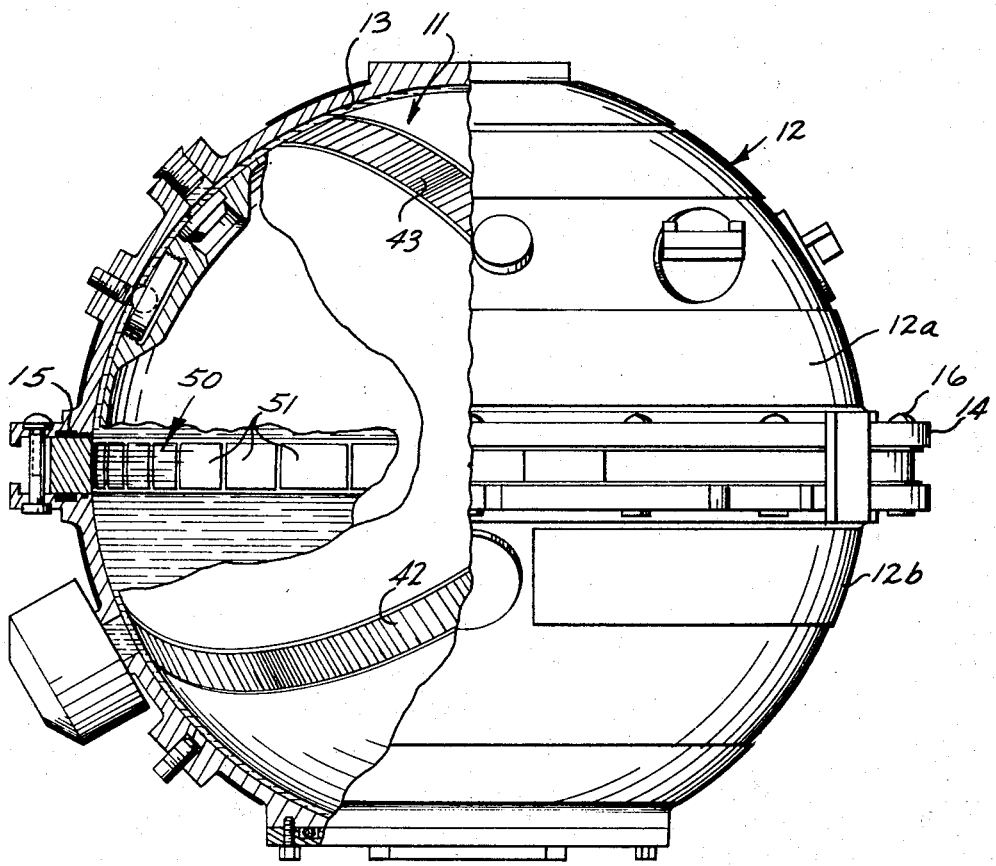
FIG-1
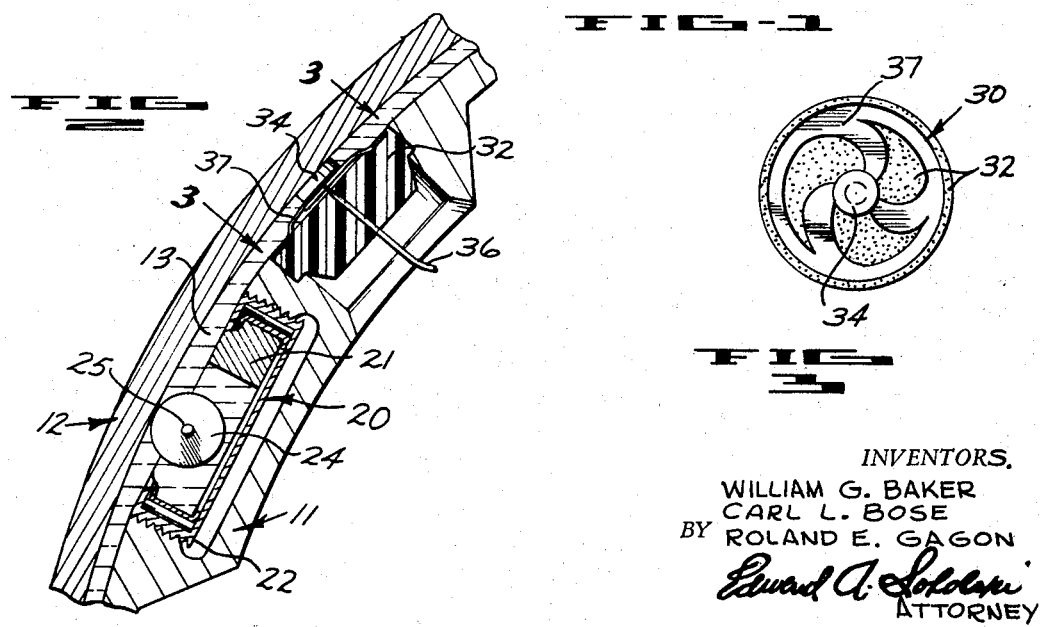
FIG-2
FIG-3
INVENTORS.
WILLIAM G. BAKER
CARL L. BOSE
BY ROLAND E. GAGON
ATTORNEY

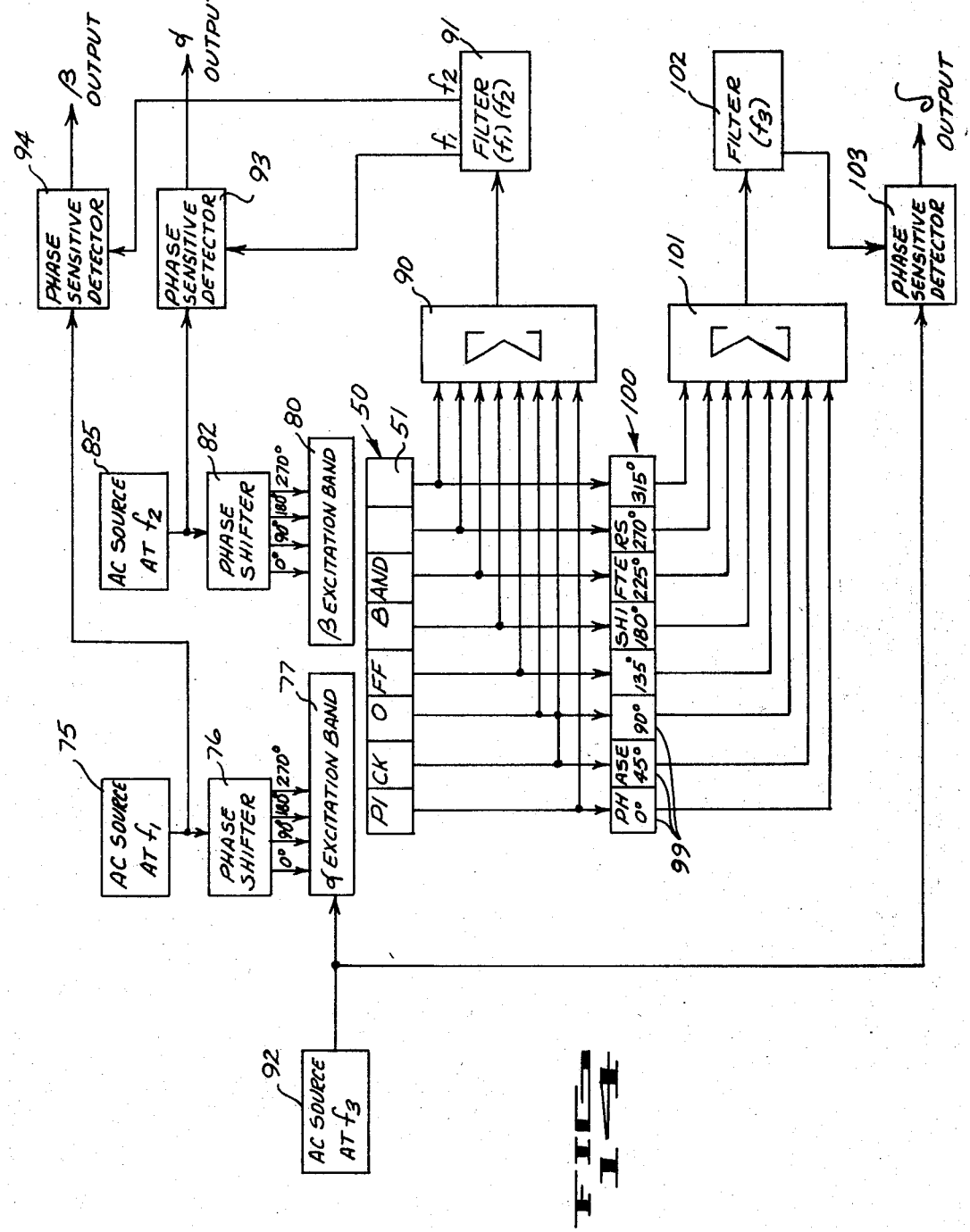

INVENTORS.
WILLIAM G. BAKER
CARL L. BOSE
BY ROLAND E. GAGON

ATTORNEY

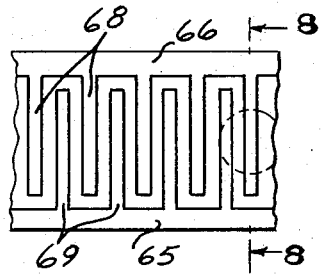
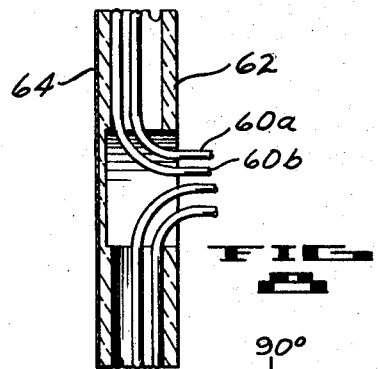
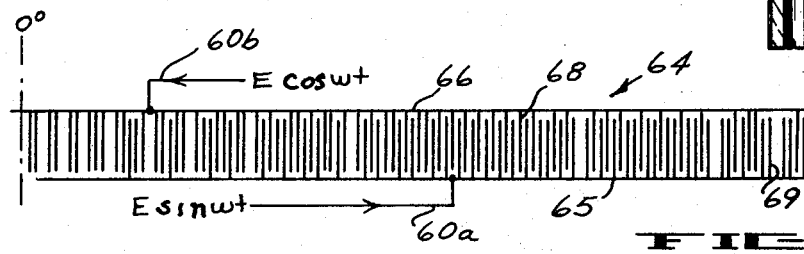
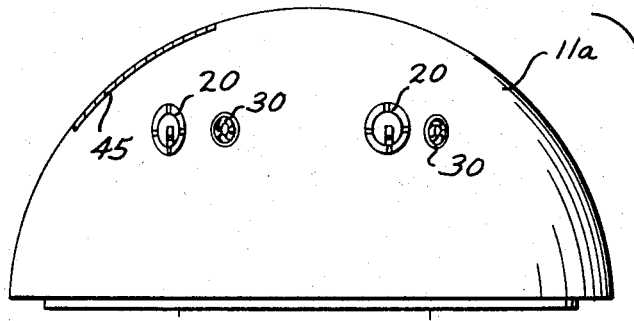
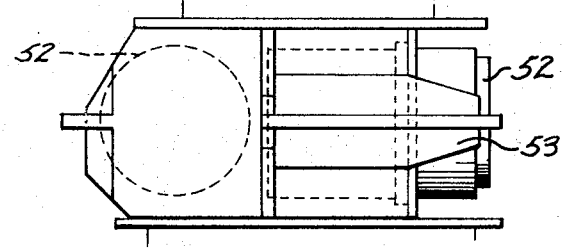
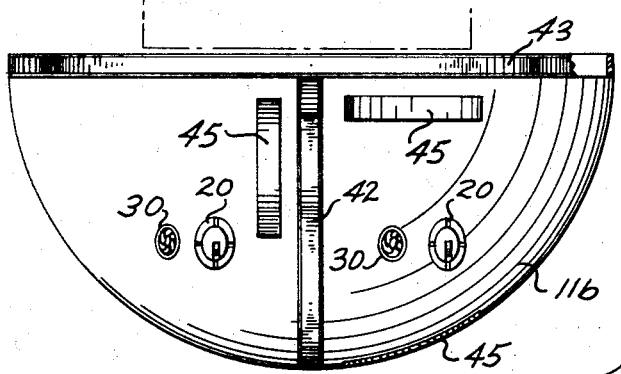

United States Patent Office 3,439,546
Patented Apr. 22, 1969

3,439,546
FLOATED INERTIAL PLATFORM
William G. Baker, Rolling Hills, Carl L. Bose, Palos Verdes Estates, and Roland E. Gagon, Rolling Hills Estates, Calif., assignors to Northrop Corporation, Beverly Hills, Calif., a corporation of California
Filed Oct. 24, 1965, Ser. No. 504,511
Int. Cl. G01c 19/28
U.S. Cl. 74—5.6                    15 Claims

ABSTRACT OF THE DISCLOSURE

A ball-shaped inertial platform, in which platform equipment is mounted, is supported on a spherical fluid bearing formed between the platform and a spherical support casing. The platform is centered within the casing by means of low-friction roller wheels mounted on the platform's outer surfaces for two degrees of freedom. Power and communications signals are coupled to the platform through low-friction brush contacts which protrude from the platform walls and contact the support casing. Attitude information is provided from the platform by means of capacitive pickoff system utilizing pairs of excitation strips on the platform and pickoff plate members on the casing.

---

This invention relates to a floated inertial platform and more particularly to such a device which comprises a ball-shaped platform member which is supported for three degrees of freedom within a spherical casing.

Inertial platforms are utilized in vehicle guidance and control systems to provide a stable reference platform as the vehicle is maneuvered. Thus, the platform is maintained fixed in inertial space and provides a support for acceleration sensitive instruments which is isolated from local vehicle maneuvers and thereby enables such instruments to accurately measure the travel of the vehicle from an initial reference point. The stabilized platform also enables the generation of signals indicating the attitude of the vehicle which are useful in the control thereof.

In achieving three-axis stabilization, most platforms of the prior art utilize gimbaling systems. Such gimbaling systems often involve complicated mechanizations which are costly and tend to lack the accuracy and reliability to be desired. Further, gimbal support systems readily amplify ambient vibrations to the platform, and thus the instrumentation mounted thereon is subjected to such vibratory signals which tend to impair the accuracy of the performance thereof.

In order to overcome the shortcomings of platform gimbaling systems, floated spherical platforms have been developed. Such floated platforms of the prior art, however, have several distinct shortcomings. Firstly, they generally fail to provide communications systems for transferring information from the platform which have the desired accuracy and reliability. Further, the pickoff systems utilized to obtain the desired vehicle attitude information either are overly complicated in their implementation or lack the necessary accuracy and reliability. Also, the devices utilized for centering the spherical platform within its casing fail to provide the necessary low friction characteristics.

The device of this invention overcomes these shortcomings of prior art devices by providing a ball-shaped platform in which the platform equipment is mounted, which is supported on a spherical fluid bearing formed between the ball-shaped platform and a spherical support casing. The platform is centered within the casing by means of low-friction roller wheels mounted on the platform's outer surfaces for two degrees of freedom.

The platform is maintained inertially stabilized within its casing by means of magnetic torquing coils which receive stabilizing signals from gyroscopic sensors mounted on the platform. The torquing coils operate to provide eddy current torquing in conjunction with the casing in response to the stabilizing signals.

Power is coupled to the platform and communications signals are coupled therefrom through low friction brush contacts which protrude from the platform walls and contact the inner walls of the support casing, the communication signals being multiplexed and modulated on the power signals.

Attitude information is provided by means of a unique capacitive pickoff system utilizing pairs of excitation strips on the platform and pickoff plate members on the casing, which generates an AC signal having a phasal relationship to a fixed reference which is accurately indicative of vehicle attitude, a separate such output being provided for each of three mutually orthogonal axes.

It is therefore an object of this invention to provide an accurate inertial platform having greater simplicity than prior art devices.

It is another object of this invention to provide an inertial platform having an improved capability for withstanding rigorous ambient mechanical shock and vibration conditions.

It is a further object of this invention to increase the reliability and accuracy of floated inertial platforms.

It is still a further object of this invention to provide an improved attitude pickoff system for a floated inertial platform.

It is still another object of this invention to provide improved communications for a floated inertial platform.

It is still another object of this invention to improve the techniques utilized to center a floated spherical platform.

Other objects of this invention will become apparent from the following description taken in connection with the accompanying drawings, of which FIG. 1 is an elevation view with a partial cutaway section showing a preferred embodiment of the device of the invention.

FIG. 2 is a cross sectional view illustrating the centering wheels and electrical contact brushes utilized in the preferred embodiment of the device of the invention.

FIG. 3 is a view of the preferred embodiment of the brushes utilized in the device of the invention as taken along the plane indicated by 3—3 in FIG. 2.

Figure 4:
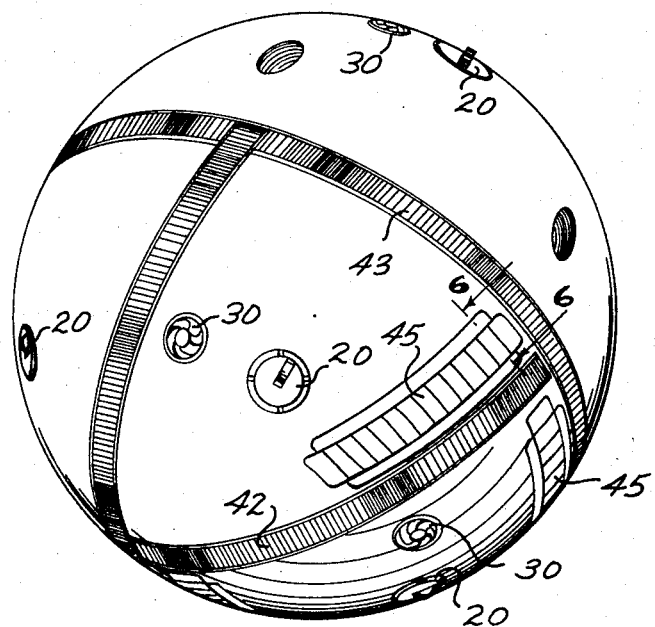
Figure 5:
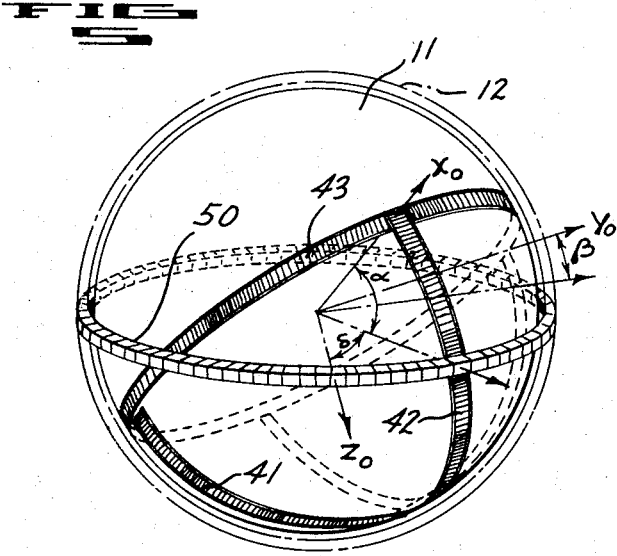
Figure 6:
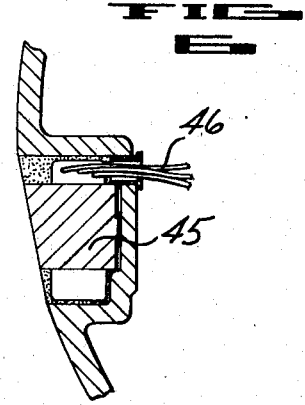
Figure 11:
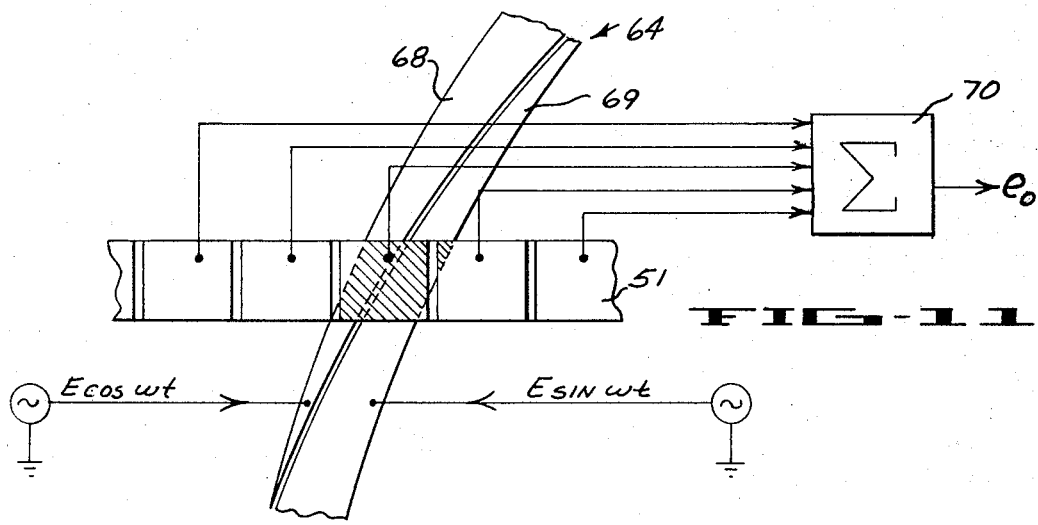
Figure 12:
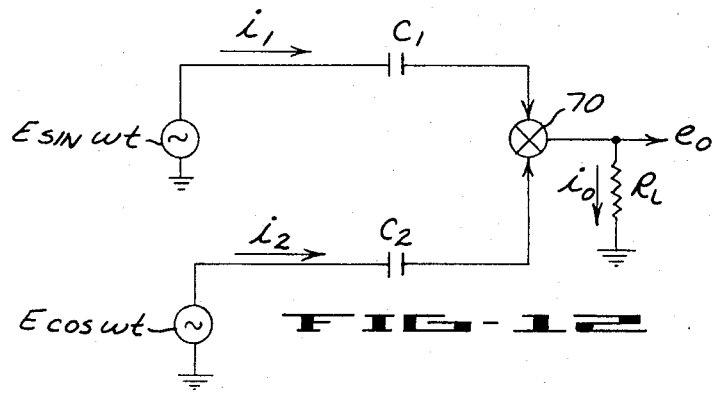
Figure 13:
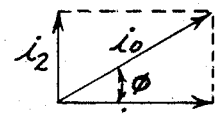
Figure 15:
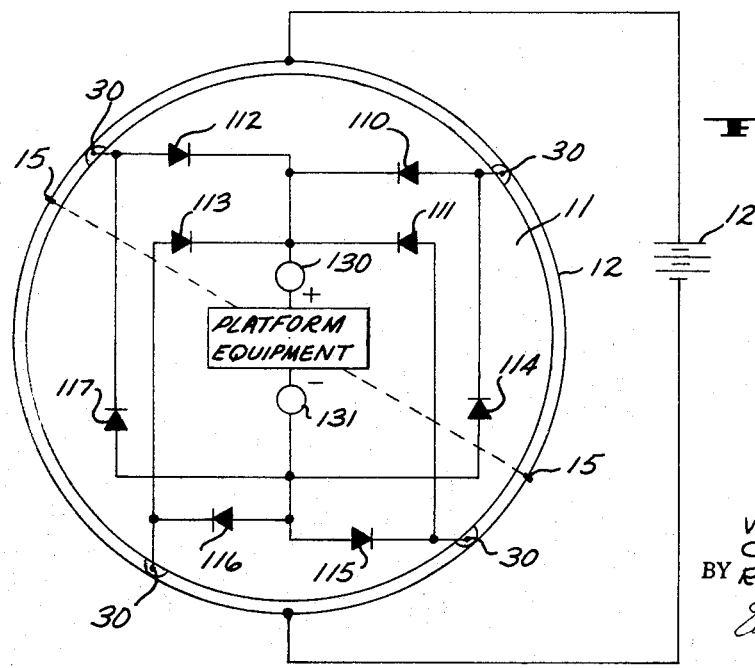

FIG. 4 is a perspective view of a preferred embodiment of the platform member of the device of the invention, FIG. 5 is a schematic view illustrating various pickoff angles which may be detected by the pickoff system of the device of the invention, FIG. 6 is a cross sectional view of the torquing units utilized in the preferred embodiment of the invention as taken along the plane indicated by 6—6 in FIG. 4, FIG. 7 is a plan view illustrating the construction of the excitation bands which may be utilized in the preferred embodiment of the pickoff system of the device of the invention, FIG. 8 is a cross sectional view of the pickoff system excitation bands as taken along the plane indicated by 8—8 in FIG. 7, FIG. 9 is a plan view illustrating a portion of the excitation bands of the preferred embodiment of the device of the invention, FIG. 10 is an exploded view of a preferred embodiment of the platform member of the device of the invention, FIGS. 11–13 are schematic drawings illustrating the operation of the pickoff mechanism utilized in the preferred embodiment of the device of the invention, FIG. 14 is a schematic drawing illustrating a preferred embodiment of circuitry utilized to generate the pickoff signals in the device of the invention, and FIG. 15 is a schematic drawing illustrating circuitry utilized in the preferred embodiment of the invention to assure proper polarity of the platform supply power at all platform orientations.

Referring now to the figures with particular reference to FIGS. 1–4 and 10, ball-shaped platform member 11 is supported within spherical casing 12 on a fluid bearing 13 which may comprise a liquid such as Fluorolube. Casing 12 and platform 11 may be fabricated of metals such as iron and aluminum respectively. Casing 12 comprises upper and lower halves 12a and 12b joined together by means of bolts 16 which clamp together flange members 14. Upper and lower halves 12a and 12b are electrically insulated from each other by means of insulator rings 15. Mounted in each of the four quadrants of the upper and lower halves 11a and 11b respectively of platform 11 is a roller wheel assembly 20.

As shown in FIG. 2, each roller wheel assembly includes a wheel support member 21 which is mounted in a casing 22 for rotation about an axis, an extension of which runs through the center of the platform. Wheel member 24 is rotatably mounted on pin 25, pin 25 being fixedly attached to support member 21. Thus, wheel member 24 has freedom of rotation about two mutually orthogonal axes and provides low friction centering of platform 11 within casing 12.

Mounted in each of the eight sectors of platform 11 is an electrical brush member 30. As can be seen by reference to FIGS. 2 and 3, brush members 30 are fastened to insulating support members 32 which may be fabricated of plastic and which serve to electrically insulate the brush members from the platform casing. Brush members 30 include centrally located contact buttons 34 which are resiliently urged against the walls of casing 12 by means of spring members 37, such spring members being fixedly attached at their inner ends to buttons 34 and at their outer edges to insulating members 32. A lead wire 36 is attached to each button 34 to connect this button to the appropriate platform equipment.

Imbedded in the surfaces of ball 11 are pickoff excitation strips 41, 42 and 43. These strips each comprise a plastic insulating backing having an etched circuit strip affixed thereto, this etched circuit strip having a series of conductive fingers which form varying density capacitor elements to be explained in detail in connection with FIGS. 7–9. The electrically conductive portions of strips 41–43, must, of course, be kept insulated from ball member 11.

Also imbedded in the surfaces of ball platform member 11 are torquing units 45. Torquing units 45 are arranged around the surfaces of ball 11 as necessary to provide three-axis eddy current torquing to maintain the ball inertially stabilized within support casing 12. Torquing units 45, which in the preferred embodiment comprise two phase induction motor field windings, receive two phase AC signals on wire leads 46 which are generated in response to gyro pickoffs on the stabilizing gyros for each of the three stabilization axes. The two phase AC signals fed to torquing units 45 induce eddy currents in the surfaces of support sphere 12 and the magnetic fields induced by these eddy currents react with the magnetic fields generated by the torquing coil to provide a stabilizing torque to platform 11 to keep the platform inertially stabilized. Such eddy current torquing systems for use in stabilizing inertial platforms are well known in the art. It is to be noted that the torquing units 45 magnetically react with casing 12 to generate an attractive force tending to draw these two members together. The ball member 11, however, is maintained centered against this attractive force by means of low friction roller wheel members 24.

Mounted in the inner wall of spherical casing 12 at the point where casing hemispheres 12a and 12b are joined together, and thus forming a great circle around the casing wall, is pickoff ring 50. Capacitive pickoff ring 50 comprises a plurality of pickoff plates 51 facing the surfaces of platform ball member 11, which are insulated from each other and from casing 12. Pickoff plates 51 are utilized to convey an attitude pickoff signal, as to be explained in connection with FIGS. 11–14.

With particular reference to FIG. 10, mounted within platform ball member 11 are stabilization gyros 52 which are positioned to sense platform rotation about each of three mutually orthogonal axes. Also contained within platform member 11 are inertial sensing instruments 53 which may comprise accelerometers for sensing vehicle travel, and the various circuits necessary to implement the sensing, stabilization and attitude pickoff functions.

In a preferred embodiment of the device of the invention, ball member 11 is supported within spherical casing member 12 on a fluid bearing comprised of Fluorolube with a spacing of approximately .01 inch between the surfaces of ball member 11 and spherical casing 12.

Referring now to FIG 5, the pickoff system utilized in the preferred embodiment of the device of the invention is schematically illustrated. As to be explained more fully further on in the specification, a pickoff signal is developed on capacitive pickoff band 50 by virtue of the relative orientation between pickoff band 50 and excitation bands 41–43. These pickoff signals for each of the three mutually orthogonal axes, X, Y, Z, are indicated in FIG. 5 by the angles $\alpha$, $\beta$ and $\delta$ respectively. Thus, the angle $\alpha$ is measured from a reference point on band 42 (indicated as $X_0$) to the point on this band which intersects with pickoff band 50. Similarly, angle $\beta$ is measured from reference point $Y_0$ to the intersection between bands 41 and 50; and angle $\delta$ is measured from an initial reference point, $Z_0$, on pickoff band 50 to the point on band 50 that intersects with excitation band 42. Band 43 is an extra band utilized to substitute for either band 41 or band 42 should either of these bands become coplanar with band 50, which would of course impair the pickoff operation. When this condition occurs, switchover relays associated with brushes 30 automatically substitute band 43 as the situation may require. The angles $\alpha$, $\beta$ and $\delta$ can, of course, readily be transformed into Eulerian coordinates by well known computation techniques to satisfy operational requirements, such as an ordered Eulerian transformation utilizing angles $\alpha$, $\epsilon$, and $\delta$ in that order where $\epsilon = \tan^{-1}(\tan \beta \cos \alpha)$.

Referring now to FIGS. 7–9, portions of a typical excitation band of the preferred embodiment of the invention are illustrated. Each excitation band comprises a plastic backing 62 having an etched circuit strip 64 affixed thereto. Etched circuit strip 64, which may be fabricated by techniques known in the art, includes a top conductive line 66 from which a plurality of conductive fingers 68 extend and a bottom conductive line from which a plurality of conductive fingers 69 extend. Fingers 68 and 69 are interleaved but are electrically insulated from each other. Each of conductive lines 65 and 66 is connected to a separate input lead wire 60a and 60b respectively, having AC signals fed thereto which are at the same frequency but have a quadrature relationship. Thus, strip 66 receives an AC signal, $E \cos \omega t$, and strip 65 receives an AC signal $E \sin \omega t$. The frequency of these AC signals may be in the audio frequency range, e.g., between 2 and 15 kilocycles.

Fingers 68 are arranged along the length of strip 66 so that they have a density therealong which is greatest on the left hand side, as shown in FIG. 9 (indicated as the "0" degree end) and decreases substantially as a sinusoidal function as we approach the right hand end (indicated as the "90" degrees end); the angular displacement between "0" and "90" degrees thus being represented by sinusoidal function of finger density. The fingers 69 extending from strip 65 have the lowest density at the "0" degree end of the strip and an increasing density as we approach the "90" degree end, the density distribution again being substantially a sinusoidal function of the distance from the end of the strip.

To facilitate the explanation of the operation of the pickoff system, let us now refer to FIGS. 11–13. Referring particularly to FIG. 11, the areas of fingers 68 and 69 for convenience of illustration are shown as conductive sections which vary oppositely in width as substantially sine and cosine functions respectively along the length of the strip. This thus gives us a varying width for each of sections 68 and 69 which is equivalent to the varying finger density illustrated in FIG. 9. With relative motion between ball member 11 and casing 12, various portions of strip member 64 will be positioned opposite capacitive pickoff plates 51. The portions of excitation members 68 and 69, as indicated by the shaded areas thereof, which appear opposite pickoff plates 51, form opposite plates of a capacitor therewith, the effective capacitance being proportional to the area of the oppositely oriented sections. Thus, as shown, excitation member 69 presents a greater capacitor plate area than member 68, thus making for greater effective capacitance between member 69 and pickoff plates 51 than between member 68 and such plates. This relative capacitance varies as a function of the relative positioning between strip 64 and capacitive plates 51. Excitation member 68 is excited with a voltage, $E \cos \omega t$, while member 69 is excited with a voltage, $E \sin \omega t$.

The individual outputs of capacitive plates 51 are fed to summing device 70 the output of which, $e_0$, represents the pickoff angle. Such output represents the vector sum of the voltages developed by the currents flowing from excitation members 68 and 69. This can be seen as follows by reference to FIGS. 12 and 13.

A first current, $i_1$, is generated by voltage $E \sin \omega t$ and flows through capacitor, $C_1$, which represents the capacitance between excitation member 69 and pickoff plates 51. A second current, $i_2$, generated by voltage $E \cos \omega t$ which is in quadrature with current $i_1$, passes through capacitor, $C_2$, which represents the capacitance between excitation member 68 and pickoff plates 51. Currents $i_1$ and $i_2$ are fed through capacitors $C_1$ and $C_2$ respectively to summing device 70. The output of summing device 70, current, $i_0$, flows through resistive load, $R_1$, and is the vector sum of quadrature related currents $i_1$ and $i_2$. With a resistive load, $R_1$, $e_0$ is in phase with $i_0$.

The vector addition of currents $i_1$ and $i_2$ is illustrated in FIG. 13. As can be seen, the output current, $i_0$, has a phase angle $\theta$ with relation to $i_1$, which is a function of the relative magnitudes of $i_1$ and $i_2$. The magnitudes of currents $i_1$ and $i_2$ vary, of course, directly with the magnitudes of capacitances, $C_1$ and $C_2$, respectively. Thus it can be seen that the relative phase angle of output current $i_0$ (and thus voltage $e_0$) varies as a direct function of the relationship between the magnitudes of $C_1$ and $C_2$. The capacitances of $C_1$ and $C_2$, of course, vary as a function of the areas of the plates forming these capacitors, and thus the density variations of fingers 68 and 69 enable the generation of an output signal which varies in its relative phase in accordance with angular displacement.

Referring now to FIG. 14, a schematic drawing showing the pickoff system utilized in the preferred embodiment of the device of the invention is shown. AC source 75 generates an output signal at a first frequency, $f_1$, which is fed to phase shifter 76. Phase shifter 76 has outputs in phase with and shifted 90°, 180° and 270° from the input fed thereto. The outputs of phase shifter 76 are each fed to a respective one of the excitation strips of $\alpha$ excitation band 77.

$\beta$ Excitation band 80 is similarly excited with phase shifted output signals from phase shifter 82, which in turn receives an AC signal from AC source 85 at a second frequency, $f_2$. A third AC source 92 having an output at a frequency, $f_3$, is connected to excite all of the strips of $\alpha$ excitation band 77 in the same phase. In an operative embodiment of the device of the invention, frequencies of 3.25 kc., 6.25 kc., and 12.5 kc. for $f_1$, $f_2$, and $f_3$ have been utilized.

As already explained, the excitation currents on $\alpha$ and $\beta$ excitation bands 77 and 80 respectively, are picked up by capacitive pickoff plates 51 of pickoff band 50, these currents having a phasal relationship to the outputs of AC sources 75 and 85 respectively, which is indicative of the associated relative pickoff displacement angles.

The outputs of pickoff plates 51 are fed to summing device 90 and thence to frequency filter 91. Filter 91 utilizes selectively tuned circuits to separate frequencies $f_1$ and $f_2$ into separate outputs which are fed respectively to phase sensitive detector 93 and phase sensitive detector 94. Phase sensitive detectors 93 and 94 receive reference signals from AC sources 85 and 75 respectively. These phase sensitive detectors may comprise conventional phase comparator circuits which generate outputs having a magnitude in accordance with the phasal relationship between a reference and an input signal. Thus, phase sensitive detector 93 has an output in accordance with an angle $\alpha$ representing vehicle attitude about a first axis, while phase sensitive detector 94 has an output in accordance with the angle $\beta$ representing vehicle attitude about a second axis.

The vehicle attitude about a third axis as represented by the $\delta$ angle output, is generated by means of the circuitry including phase shifters 100, summing device 101, filter 102 and phase sensitive detector 103. The output of AC source 92 which is at a third frequency, $f_3$, is fed in phase to all of the excitation strips of $\alpha$ excitation band 77. Each of the capacitive pickoffs 51 of pickoff band 50 is fed to a separate phase shifter unit 99 of phase shifters 100. Each phase shifter unit 99 generates a signal successively phase shifted by 45 degrees. Thus, each pickoff plate 51 is effectively "phase" coded.

The outputs of phase shifters 100 are fed to summing device 101. The phase relationship of the signals received by summing device 101 to the output of AC source 92 will therefore be indicative of the angular displacement of $\alpha$ excitation band 77 from pickoff band 50 from a given reference point established by the "0" degree pickoff plate 51. Filter 102 selectively passes frequency $f_3$ which is the desired phase shifted signal, and this output is fed to phase sensitive detector 103. Phase sensitive detector 103 operates similarly to phase sensitive detectors 93 and 94 to compare the phases of the outputs of AC source 92 and filter 102 and generate an output signal having an amplitude indicative of this phasal relationship. In this manner, three signals indicative of angular displacements about three mutually orthogonal axes are generated.

Referring now to FIG. 15, a schematic drawing illustrating the circuitry for connecting power from the support sphere to the ball shaped platform member is shown. It is essential for the proper operation of the platform equipment that the polarity of the DC power fed thereto be maintained the same for all platform orientations. Thus, for example, should the platform flip over 180° relative to its initial orientation with relationship to the casing, a flipover of power connections is necessary. This end result is achieved by means of a diode matrix including diodes 110–117.

DC power is fed from power source 120 with the positive terminal of power source 120 being connected to one hemisphere of casing 12 and the negative terminal of power source 120 being connected to the other hemisphere thereof. As already noted, the hemispheres of casing 12 are insulated from each other by means of insulating rings 15. Each of brushes 30 has a pair of diodes connected thereto, one of these diodes being connected to provide a positive current flow to terminal 130, the other of these diodes being connected to provide a negative current flow to terminal 131. Terminals 130 and 131 are connected to platform equipment 135 and, as already noted, receive not only DC power but also various AC signals modulated thereon. Thus, regardless of the orientation of any one of brushes 30, such brush will operate only to provide the desired potential between terminals 130 and 131.

The diode matrix operating in conjunction with brushes 30 is also utilized to provide a rough orientation signal for switching over from either bands 41 or 42 to band 43, should either of these first two bands become coplanar with the pickoff band. When this condition arises, certain of brushes 30 will be oriented relative to spherical casing 12 so as to result in particular brush polarities which can be utilized to actuate appropriate switchover relays (not shown).

The device of this invention thus provides an improved floated inertial platform having greater reliability and accuracy than prior art devices. This end result is achieved by means of a combination of improved ball centering and power and communications signal feed techniques along with a highly accurate capacitive attitude pickoff system.

While the device of the invention has been described and illustrated in detail, it is to be clearly understood that this is intended by way of illustration and example only and is not to be taken by way of limitation, the spirit and scope of this invention being limited only by the terms of the following claims.

We claim:
1. A floated inertial platform comprising a ball-shaped platform member, a spherical casing member surrounding said platform member comprising two hemispheres joined together in electrically insulated relationship to each other, and a fluid bearing formed between said casing and platform members for supporting said platform member within said casing member,
    said platform member including a plurality of roller wheel members having two degrees of rotational freedom mounted on the outside surfaces thereof for centering said platform member within said casing member,
    said platform member further including a plurality of resilient electrical brushes distributed around the outside surfaces thereof and insulated from said surfaces for providing electrical connections between said platform member and said casing member.
    platform equipment mounted in said platform member for providing control signals,
    means for maintaining said platform member inertially stabilized, and
    pickoff means for generating an output signal indicative of the orientation of said platform member relative to said casing member.
2. A floated inertial platform comprising a ball-shaped platform member, a spherical casing member surrounding said platform member comprising two hemispheres joined together in electrically insulated relationship to each other, and a fluid bearing formed between said casing and platform members for supporting said platform member within said casing member,
    said platform member including a plurality of roller wheel members having two degrees of rotational freedom mounted on the outside surfaces thereof for centering said platform member within said casing member,
    said platform member further including a plurality of resilient electrical brushes distributed around the outside surfaces thereof for providing electrical contact between said platform member and said casing member,
    a DC power source for said platform equipment, the positive terminal of said power source being connected to one of the hemispheres of said casing member, the negative terminal of said power source being connected to the other of the hemispheres of said casing member,
    platform equipment mounted in said platform member for providing control signals,
    means for maintaining said platform member inertially stabilized, and
    pickoff means for generating an output signal indicative of the orientation of said platform member relative to said casing member.
3. The device as recited in claim 2 and further including diode matrixing means for connecting power from said brushes to said platform equipment in the same polarity for all relative orientations between said platform and casing members.
4. A floated inertial platform comprising a ball-shaped platform member, a spherical casing member surrounding said platform member comprising two hemispheres joined together in electrically insulated relationship to each other, and a fluid bearing formed between said casing and platform members for supporting said platform member within said casing member,
    said platform member including a plurality of roller wheel members having two degrees of rotational freedom mounted on the outside surfaces thereof for centering said platform member within said casing member,
    said platform member further including a plurality of resilient electrical brushes distributed around the outside surfaces thereof for providing electrical contact between said platform member and said casing member,
    platform equipment mounted in said platform member for providing control signals,
    means for maintaining said platform member inertially stabilized, and
    pickoff means for generating an output signal indicative of the orientation of said platform member relative to said casing member, said pickoff means comprising a ring-shaped capacitive pickoff band mounted on the inner wall of said casing member, and a plurality of ring shaped excitation bands mounted on the outer surfaces of said platform member, said pickoff band including a plurality of pickoff plates, said excitation bands including first and second conductive members oriented opposite each other, said first conductive member having an effective capacitive area therealong that varies from one end thereof substantially as a sine function, said second conductive member having an effective capacitive area therealong from the end thereof corresponding to said one end of said first conductive member that varies substantially as a cosine function, and means for exciting said conductive members with quadrature related AC signals.
5. The device as recited in claim 4 wherein said conductive members each comprise a longitudinal conductive line and a plurality of transverse conductive fingers extending from said line, the density of said fingers varying substantially sinusoidally along said lines.
6. The device as recited in claim 4 and additionally including means for exciting each of said excitation bands at a separate frequency, means connected to said pickoff band for filtering out each of said frequencies, and separate phase sensitive detector means responsive to each of said frequencies for generating an output in accordance with the relative position between one of said excitation bands and said pickoff band.
7. In a floated inertial platform comprising a ball-shaped platform member floated within a spherical casing, a capacitive pickoff device for determining the relative orientation between said platform member and said casing comprising
    an excitation strip member attached to the outer wall of said platform member, said excitation strip mem- ber including a pair of oppositely oriented electrically conductive lines, each of said lines having a plurality of fingers extending therefrom, the fingers of one of said lines interleaving with the fingers of the other of said lines, the density of the fingers extending from one of said lines increasing substantially sinusoidally from one end of said strip member to the other end thereof, the density of the fingers extending from the other of said lines increasing substantially sinusoidally from the other end of said strip member to said one end thereof, capacitive pickoff plate means attached to the inner wall of said casing, means for exciting one of the lines of said strip member with a first sinusoidal voltage, means for exciting the other of the lines of said strip member with a second sinusoidal voltage at the same frequency as said first excitation voltage but phase displaced therefrom, and phase sensitive detector means for comparing the output of said pickoff plate means to the output of said first voltage source and generating an attitude signal in accordance with the phase difference therebetween.

8. The device as recited in claim 7 and additionally including a second excitation strip member similar to said first strip member attached to the outer wall of said platform member, said second strip member being oriented substantially perpendicularly to said first strip member, means for exciting said second strip member with a third sinusoidal voltage at a frequency different from that of the excitation voltage of said first strip member, and phase sensitive detector means responsively connected to receive the output of said pickoff plate means and said third sinusoidal voltage for generating an output signal in accordance with the relative orientation between said pickoff plate means and said second excitation strip member.

9. The device as recited in claim 7 wherein said first and second sinusoidal voltages are in quadrature relationship.

10. The device as recited in claim 7 wherein said capacitive pickoff plate means includes a plurality of pickoff plates, means for exciting the lines of said strip member with a third sinusoidal voltage at a frequency separated from that of said first and second voltages, phase shifter means for phase shifting the outputs of each of said pickoff plates a different predetermined amount, and phase sensitive detector means responsive to the output of said phase shifter means and said third sinusoidal voltage for generating an attitude signal in accordance with the phase relationship therebetween.

11. The device as recited in claim 7 wherein said pickoff means is ring shaped and is oriented in a plane angularly related to that of said excitation strip member.

12. The device as recited in claim 7 wherein said pickoff means comprises a plurality of separate pickoff plate members arranged in a ring forming a great circle around said casing.

13. The device as recited in claim 7 and additionally including a second excitation strip member similar to said first excitation strip member attached to the outer wall of said platform member, said second strip member being oriented substantially normal to said first strip member, said second strip member being excited in lieu of said first strip member when said capacitive pickoff plate means and said first strip means are substantially co-planar.

14. A pickoff device for determining the relative orientation between first and second members comprising an excitation strip attached to said first member, said excitation strip including a pair of electrically conductive lines, each of said lines having a plurality of electrically conductive fingers connected thereto, the fingers of one said lines being arranged opposite the fingers of the other of said lines along the longitudinal extent of said strip, the density of the fingers connected to said one of said lines increasing substantially sinusoidally from one end of said strip to the other end thereof, the density of the fingers connected to said other of said lines increasing substantially sinusoidally from the other end of said strip to said one end thereof, a capacitive pickoff attached to said second member, said pickoff being located opposite said strip.

means for exciting each of said lines with a separate sinusoidal voltage, said sinusoidal voltages being at the same frequency but phase displaced from each other, and phase sensitive detector means connected to receive the output of said pickoff and one of the sinusoidal voltage outputs of said exciting means for generating a signal in accordance with the phase relationship therebetween, said signal being indicative of the relative orientation between said members.

15. The device as recited in claim 14 wherein said first member is ball shaped and said second member is a spherical casing in which said first member is mounted, said capacitive pickoff being in the shape of a ring forming a great circle running around the inner wall of said casing, said excitation strip forming a curvilinear band attached to the outer wall of said first member.

References Cited

UNITED STATES PATENTS

| 1,501,886 | 7/1924 | Abbot. | |
| 2,393,473 | 1/1946 | Jones. | |
| 2,855,781 | 10/1958 | Alburger | 74—5 |
| 2,960,878 | 11/1960 | Lees | 74—5 X |

C. J. HUSAR, *Primary Examiner.*